United States Patent Office 3,322,812
ALKYL ISOCYANATOALKYL CARBONATES
Thomas K. Brotherton and John W. Lynn, Charleston, W. Va., assignors to Union Carbide Corporation, a corporation of New York
No Drawing. Filed Nov. 14, 1963, Ser. No. 323,616
3 Claims. (Cl. 260—463)

This invention relates to novel carbonate compositions and to a process for their preparation. In one aspect, this invention relates to novel carbonate amines and carbonate isocyanates.

The novel compositions of this invention can be conveniently represented by the following formula:

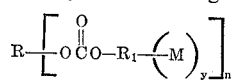

wherein M represents a member selected from the class consisting of —$NH_2$ and —NCO groups; $R_1$ represents a hydrocarbon group; $y$ has a value of from 1 to 2; $n$ has a value of from 1 to 4; and R represents an aliphatic group, which is derived from an alcohol in which the salt of the compound

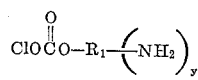

is at least partially soluble, $R_1$ and $y$ having the same value as previously indicated. Preferred carbonates are those wherein R represents a monovalent aliphatic hydrocarbon of from 1 to 8 carbon atoms, a polyvalent aliphatic hydrocarbon group or a polyvalent aliphatic group containing one or more oxygen atoms, siad polyvalent groups containing from 2 to 200 carbon atoms; and $R_1$ contains from 2 to 12 carbon atoms. Particularly preferred compositions are those wherein R represents lower alkyl, e.g., methyl; $R_1$ represents a linear hydrocarbon chain, a group containing a cycloaliphatic hydrocarbon nucleus having from 4 to 8 carbon atoms in said nucleus, or a group containing a single or fused ring aromatic hydrocarbon nucleus having from 6 to 10 carbon atoms in said nucleus.

Additionally, the present invention encompasses the amine salts of the aforementioned novel compounds having the formula:

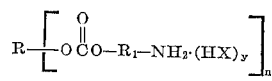

wherein R, $R_1$, $y$ and $n$ have the same value as previously indicated and HX represents hydrogen chloride, hydrogen bromide, or mineral acids such as sulfuric, phosphoric and the like.

Illustrative compounds encompassed by the present invention include, among others, methyl 2-aminoethyl carbonate, methyl 9-aminononyl carbonate, propyl 2,6-diaminophenyl carbonate, hexyl 3-aminocyclohexyl carbonate, 4-aminophenoxycarbonyloxybutyl 4-aminophenyl carbonate, tetra(2-aminoethoxycarbonyloxymethyl) methane, methyl 2-isocyanatoethyl carbonate, methyl 2,6-diisocyanatophenyl carbonate, hexyl 3-isocyanatocyclohexyl carbonate, ethylene bis(2-isocyanatoethyl carbonate), tetra(2 - isocyanatoethoxycarbonyloxymethyl) methane, and the corresponding salts of the amine carbonates.

The novel compounds of this invention are multifunctional in that each compound contains at least one primary amino group or an isocyanate in the molecule. The novel compounds of this invention which contain an amine group are useful as curing agents for epoxy resins, and as intermediates for the preparation of numerous chemical compounds. In particular, these compositions are useful as intermediates in the preparation of novel carbonate isocyanates.

The isocyanate compounds of this invention are very reactive materials which condense readily with active hydrogen-containing compounds such as alcohols, amines, carboxylic acids, amides, and water, to form the corresponding carbamates, ureas, and the like. Additionally, the diisocyanate compositions can be homopolymerized to yield dimeric, trimeric and polymeric substances, or copolymerized to form valuable polymeric products. Isocyanate-containing copolymers have been found particularly useful in the preparation of urethane foams, fibers, films, coatings, elastomers, and castings. For example, the polyisocyanates are useful in the preparation of flexible, high molecular weight polymers by incorporating the polyisocyanate with flexible resins such as polyether glycols. The novel compositions of this invention are particularly useful in those fields of application wherein polyisocyanates have been utilized. More particularly, both the novel amine and isocyanate compositions of the instant invention can be utilized as reactive intermediates to produce numerous derivatives.

It is accordingly an object of the present invention to provide novel carbonate compositions which are suitable for use in the plastic and resin field. Another object is to provide novel compositions of matter comprising carbonate amines and novel salts thereof. A further object of the present invention is to provide new compositions of matter comprising the alkyl aminoalkyl carbonates, the alkylene bis(aminoalkyl carbonates), and the like, and their corresponding salts. Another object of this invention is to provide novel carbonates containing at least two primary amino groups. Another object is to provide new compositions of matter comprising carbonate isocyanates. A further object of the present invention is to provide new compositions of matter comprising the alkyl isocyanate-alkyl carbonates, the alkylene bis(isocyanatoalkyl carbonates), and the like. Another object of this invention is to provide novel carbonates containing at least two isocyanate groups. A still further object of the present invention is to provide novel compounds having polyfunctional properties. Another object of the present invention is to provide a novel process for the preparation of the aforesaid compositions. These and other objects will readily become apparent to those skilled in the art in the light of the teachings herein set forth.

In its broad aspect, this invention is directed to novel carbonates of the aforementioned general formula and to a process for their preparation. Certain of these novel compositions are multi-functional in nature in that they are characterized by the presence of at least two amine or isocyanate groups which are available for reaction.

One embodiment of the present invention is directed to the novel carbonate amines of the formula:

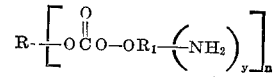

wherein R, $R_1$, $y$ and $n$ have the same value as previously indicated. Preferred compositions are those represented by the above formula wherein R represents a lower alkyl group of from 1 to 8 carbon atoms and $R_1$ represents linear hydrocarbon groups. Particularly preferred compositions are those wherein R represents a methyl group, $R_1$ represents an alkylene or alkenylene group of from 2 to 12 carbon atoms, and $n$ has a value of 1.

Also included within this embodiment are the compositions wherein $n$ has a value of 2 or greater and R of the aforesaid formula represents a polyvalent group composed of carbon hydrogen, and oxygen, the oxygen being present solely as oxy or carbonyloxy oxygen. Hence, for example, R can represent the groups

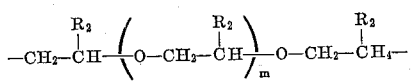

wherein $R_2$ is hydrogen or methyl and $m$ has a value of from 0 to 20.

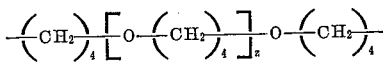

wherein $z$ has a value such that the group has a molecular weight of up to about 3000 and higher. Additionally, R can represent a group derived from polymers and copolymers of lactones, e.g., epsilon-caprolactone, delta-valerolactone, and the like.

The following compounds illustrate the novel carbonate amines of this embodiment of the present invention. The alkyl aminoalkyl carbonates, e.g., methyl 2-aminoethyl carbonate, methyl 3-aminopropyl carbonate, methyl 9-aminononyl carbonate, methyl 10-aminodecyl carbonate, methyl 2-methyl-3-aminopropyl carbonate, methyl 2,2-dimethyl-3-aminopropyl carbonate, hexyl 3,4-diethyl-5-aminopentyl carbonate, ethyl 2-methyl-4-ethyl-6-aminohexyl carbonate, methyl 5,6,7-triethyl-9-aminononyl carbonate, butyl 6-aminohexyl carbonate, pentyl 6-aminohexyl carbonate, heptyl 6-aminohexyl carbonate, and the like; the alkyl aminoalkenyl carbonates, e.g., methyl 5-amino-3-pentenyl carbonate, ethyl 8-amino-4-octenyl carbonate, propyl 9-amino-5-nonenyl carbonate, butyl 10-amino-6-decenyl carbonate, ethyl 5-amino-3-pentenyl carbonate, methyl 3,4-dimethyl-5-amino-3-pentenyl carbonate, methyl 2-methyl-4-ethyl-6-amino-3-hexenyl carbonate, ethyl 5,6,7-triethyl-9-amino-5-nonenyl carbonate, and the like; the alkenyl aminoalkyl carbonates, e.g., allyl 3-aminopropyl carbonate, and the like; the alkenyl aminoalkenyl carbonates, e.g., allyl 5-amino-3-pentenyl carbonate, 5-heptenyl 6-amino-3-hexenyl carbonate and the like.

The alkyl aminocycloalkyl carbonates, e.g. methyl 2-aminocyclobutyl carbonate, methyl 3-aminocyclopentyl carbonate ethyl 4-aminocyclohexyl carbonate, propyl 5-aminocycloheptyl carbonate, methyl 6-aminocyclooctyl carbonate, and the like; ethyl 3-amino-4-cyclopentenyl carbonate, propyl 4-amino-5- cyclohexenyl carbonate, ethyl 2-aminocyclobutylmethyl carbonate, ethyl 2-amino-3-ethylcyclobutyl carbonate, methyl 2(2-aminoethyl)-cyclobutyl carbonate, ethyl 3-aminocyclopentylmethyl carbonate, methyl 3-amino-2-ethylcyclopentyl carbonate, methyl 2-aminoethyl cyclopentyl carbonate, propyl 5-aminocycloheptylmethyl carbonate, ethyl 3-amino-5-methylcyclohexyl carbonate, hexyl 3-amino-5,6-dimethylcyclohexyl carbonate, methyl 3-amino-4-ethylcyclophentyl carbonate, methyl 3-amino-4,5-diethylcyclopentyl carbonate, propyl 4-amino-5-methyl-2-cyclohexenyl carbonate and the like.

The alkyl aminoaryl carbonates, e.g., methyl 4-aminophenyl carbonate, ethyl 2-aminophenyl carbonate, propyl 3-aminophenyl carbonate, methyl 7-amino-2-naphthyl carbonate, ethyl 7-amino-1-naphthyl carbonate, ethyl 4'-amino-4-biphenylyl carbonate, methyl 4-aminobenzyl carbonate, ethyl 4-aminophenylethyl carbonate, propyl-amino-2-naphthylmethyl carbonate, ethyl 4(3'-aminopropyl)phenyl carbonate, pentyl 4-aminomethylphenyl carbonate, ethyl 2(3'-aminopropyl)naphthyl carbonate, octyl 4-amino-2-methylphenyl carbonate, ethyl 6-amino-2,4-xylyl carbonate, methyl 4(3'-amino-1'-propenyl)phenyl carbonate, and the like.

Additional illustrative compositions encompassed by this embodiment of the invention include those wherein $n$ of the formula has a value of 2 or greater, for example, the alkylene bis(aminoalkyl carbonates) e.g., ethylene bis(2-aminoethyl carbonate), propylene bis(2-aminoethyl carbonate), and the like; the alkylene bis(aminocycloalkyl carbonates), e.g., tetramethylene bis(4-aminocyclohexyl carbonate); the alkylene bis(aminoaryl carbonates), e.g., propylene bis(4-aminophenyl carbonate); and the like; the mixed diamine carbonates, e.g., 1-(2-aminoethoxycarbonyloxy)-3-(4-aminophenoxycarbonyloxy) propane, and the like; tetra(2-aminoethoxycarbonyloxymethyl) methane, and the like.

Another embodiment of the present invention is directed to the novel carbonate isocyanates of the formula:

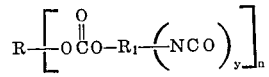

wherein R, $R_1$, $y$ and $n$ have the same value as previously indicated. Preferred compositions are those represented by the above formula wherein R and $R_1$ represent linear hydrocarbon groups. Particularly preferred compositions are those wherein R represents an alkyl group, $R_1$ represents an alkylene or alkenylene group, and $n$ has a value of 1.

The novel isocyanates also include those wherein $n$ has a value of 2 or greater and R represents the same polyvalent group composed of carbon, hydrogen and oxygen as set forth in the previous embodiment.

The following compounds illustrate the novel isocyanates of this embodiment of the present invention; the alkyl isocyanatoalkyl carbonates, methyl 2-isocyanatoethyl carbonate, ethyl 3-isocyanatopropyl carbonate, propyl 4-isocyanatobutyl carbonate, methyl 5-isocyanatopentyl carbonate, hexyl 7-isocyanatoheptyl carbonate, butyl 8-isocyanatooctyl carbonate, methyl 9-isocyanatononyl carbonate, propyl 10-isocyanatodecyl carbonate, methyl 2-methyl-3-isocyanatopropyl carbonate, propyl 2,2-dimethyl-3-isocyanatopropyl carbonate, methyl 3-ethyl-5-isocyanatopentyl carbonate, ethyl 3,4-diethyl-5-isocyanatopentyl carbonate, propyl 4,4-dimethyl-6-isocyanatohexyl carbonate, methyl 2-methyl-4-ethyl-6-isocyanatohexyl carbonate, hexyl 9-isocyanatononyl carbonate, methyl 5,6,7-triethyl-9-isocyanatononyl carbonate, butyl 6-isocyanatohexyl carbonate, propyl 8-isocyanatooctyl carbonate, pentyl 6-isocyanatohexyl carbonate, heptyl 6-isocyanatohexyl carbonate, and the like; the alkyl isocyanatoalkenyl carbonates, e.g., methyl 4-isocyanato-2-butenyl carbonate, ethyl 5-isocyanato-3-pentenyl carbonate, ethyl 7-isocyanato-4-heptenyl carbonate, methyl 8-isocyanato-4-octenyl carbonate, octyl 9-isocyanato-5-nonenyl carbonate, heptyl 10-isocyanato-6-decenyl carbonate, methyl-3-ethyl-5-isocyanato-3-pentenyl carbonate, methyl 3,4-dimethyl-5-isocyanato-3-pentenyl carbonate, butyl 2-methyl-4-ethyl-6-isocyanato-3-hexenyl carbonate, propyl 5,6,7-triethyl-9-isocyanato-6-nonenyl carbonate, and the like; the alkenyl isocyanatoalkyl carbonates, e.g., allyl 3-isocyanatopropyl carbonate, allyl 5-isocyanato-3-pentenyl carbonate, 5-heptenyl 6-isocyanato-3-hexenyl carbonate, and the like.

The alkyl isocyanatocycloalkyl carbonates, e.g., methyl 2-isocyanatocyclobutyl carbonate, ethyl 3-isocyanatocyclopentyl carbonate, propyl 4-isocyanatocyclohexyl carbonate, methyl 5-isocyanatocycloheptyl carbonate, propyl 6-isocyanatocyclooctyl carbonate, methyl 7-isocyanatocyclononyl carbonate, methyl 3-isocyanato-4-cyclopentenyl carbonate, propyl 4-isocyanato-5-cyclohexenyl carbonate, and the like; methyl 2-isocyanato-3-ethylcyclobutyl carbonate, propyl 3-isocyanatoethyl-2-cyclobutyl carbonate, ethyl 3-isocyanatocyclopentylmethyl carbonate, propyl 3-isocyanato-2-ethylcyclopentyl carbonate, octyl 2-isocyanatoethyl-3-cyclopentyl carbonate, methyl 5-isocyanatocycloheptylmethyl carbonate, propyl 3-isocyanato-5-methylcyclohexyl carbonate, pentyl 3-isocyanato-5,6-dimethylcyclohexyl carbonate, butyl 3-isocyanato-4-ethylcyclopentyl carbonate, propyl 3-isocyanato-4,5-diethylcyclopentyl carbonate, methyl 4-isocyanato-5-methyl-2-cyclohexenyl carbonate and the like. The alkyl isocyanatoaryl carbonates, e.g., methyl 4-isocyanatophenyl carbonate, propyl 2-isocyanatophenyl carbonate, ethyl 3-isocyanatophenyl carbonate, propyl 7-isocyanato-2-naphthyl carbonate, butyl 7-isocyanato-1-naphthyl carbonate, methyl 4'-isocyanato-4-biphenylyl carbonate, methyl 4-isocyanatobenzyl carbonate, ethyl 4-isocyanatophenylethyl carbonate, methyl 7-isocyanato-2-naphthylmethyl carbonate.

Additional illustrative compositions encompassed by this embodiment of the invention include those wherein $n$ of the formula has a value of 2 or greater, for example, the alkylene bis(isocyanatoalkyl carbonates), e.g., ethylene bis(2-isocyanatoethyl carbonate), propylene bis(2-isocyanatoethyl carbonate), and the like; the alkylene bis (isocyanatocycloalkyl carbonates), e.g., tetramethylene bis(4-isocyanatocyclohexyl carbonate); the alkylene bis (isocyanatoaryl carbonates), e.g., propylene bis(4-isocyanatophenyl carbonate); and the like; bis(2-isocyanatoethyl carbonatoethyl) ether; the mixed diisocyanate carbonates, e.g., 1-(2-isocyanatoethoxycarbonyloxy)-3-(4-isocyanatophenoxycarbonyloxy) propane, and the like, tetra(2 - isocyanatoethoxycarbonyloxymethyl) methane, and the like.

In accordance with the process of this invention, the novel carbonate amines and isocyanates of the aforementioned embodiments can be produced in relatively high yields from inexpensive and commercially available raw materials.

The carbonate amines can be conveniently prepared, for example, by sparging a carbonyl dihalide, such as phosgene, through a slurry of a hydroxy alkyl amine hydrohalide in an inert liquid reaction medium at a temperature of from about 30 to about 70° C. the amino chloroformate hydrohalide is then alcohol, isolated, as for example, by filtration and then washed and dried. The free amine is conveniently obtained by simple neutralization of the amine salt.

In general, there are several factors which are critical to the successful preparation of the carbonate amine compounds. Firstly, in the preparation of the chloroformate intermediate it is necessary that the amino group of the hydroxy amine be eliminated as a reaction site in order to obtain exclusive reaction of the hydroxyl groups with phosgene. Secondly, it is necessary that the amino groups of the amino chloroformate formed also be neutralized to minimize the possibility of rearrangement which is known to occur with free aminoalkyl esters. Thirdly, the particular products obtained from the reaction of salts of the hydroxy amine and phosgene are critically dependent upon the reaction temperature employed, and lastly, the amino chloroformate salt must be at least partially soluble in the monohydric or polyhydric reactant.

In practice, it has been found that the amino groups of the hydroxy amine starting compounds can be successfully shielded as a reaction site by the formation of the hydroxy amine salt prior to the phosgenation reaction. The salt, preferably the hydrochloride, can be formed and subsequently isolated prior to use, or employed directly without isolation. In the latter instance, solvents should be used which will remain inert during the phosgenation step. When the hydroxy amine salt is not to be isolated, it is usually necessary to conduct the neutralization in the solvent with gaseous hydrogen chloride at elevated temperatures in order to obtain a salt of satisfactory purity. When the hydroxy amine salt is to be isolated, it is preferred to effect neutralization in a solvent in which the amine is soluble, such as, for example, chloroform, dimethyl ether of ethylene glycol, tetrahydrofuran, dioxane and the like. In such circumstances, neutralization can be satisfactorily conducted at room temperature.

The products obtained from the phosgenation reaction were found to be critically dependent on the reaction temperature employed. At temperatures above 70° C., either at atmospheric or superatmospheric pressures, the bis(2-aminoethyl) carbonate hydrochloride was the major product isolated when monoethanolamine hydrochloride was treated with phosgene. Within the temperature range of from about 30° C. to about 70° C., the 2-aminoethyl chloroformate hydrochloride was formed in relatively high yields. At a reaction temperature below 30° C., substantially all the starting material was recovered. The preferred operating temperature range was from about 50°–70° C. wherein optimum yield of the 2-aminoethyl chloroformate hydrohalide was recovered.

In general, the temperature necessary to produce the chloroformate will be dependent upon both the melting point and the basicity of the particular hydroxy amine starting material. In actual practice, it has been found that the optimum yield will be obtained at a temperature which does not exceed the temperature at which the particular hydroxy amine hydrohalide would dissociate to the free amine under the conditions employed. Thus, while the phosgenation reaction is critically dependent upon the reaction temperature, the actual temperature employed will not necessarily be the same for each starting material. As a general rule, however, the temperature will usually fall within the range of from about 30° to about 150° C.

Pressure is not necessarily critical and the instant process can be conducted at atmospheric, subatmospheric or superatmospheric pressures, although the reaction of mono ethanolamine hydrochloride and phosgene under pressures of up to 150 pounds per square inch and at temperatures of from about 30° to about 70° C., as a rule, gave lower yields of the amino chloroformate hydrochloride than the corresponding reactions at atmospheric pressure.

In general, the liquid reaction medium employed in the conversion of the amine salt to the corresponding amino chloroformate hydrohalide must be inert to the reactants and stable under the conditions employed. Moreover, it should be easily separable from the resulting chloroformate hydrohalide. Typical inert, liquid solvents which have been found suitable for utilization as media in the process of the present invention include, among others, aromatic hydrocarbons such as toluene, xylene, naphthalene, tetrahydronaphthalene, benzene, biphenyl, cymene, amylbenzene; cycloaliphatic hydrocarbons such as cyclohexane, heptylcycloheptane, decahydronaphthalene; the chlorinated aromatic hydrocarbons such as chlorobenzene, orthodichlorobenzene, 1,2,4-trichlorobenzene; the chlorinated aliphatic hydrocarbons such as carbon tetrachloride, tetrachloroethylene, trichloroethylene; the dialkyl ketones such as diisobutyl ketone, methyl isobutyl ketone, methylhexyl ketone, diisopropyl ketone and other solvents such as tetramethylene sulfone, and the like.

Although the process of the instant invention preferably is conducted with phosgene, in its broadest concept the process includes the utilization of any carbonyl dihalide such as carbonyl difluoride, or carbonyl dibromide. However, for economic considerations phosgene is the preferred carbonyl dihalide. In the preparation of the novel isocyanates of this invention, phosgene can be used in either the gaseous or liquid form.

Inasmuch as the yield and rate of formation of the chloroformate are dependent upon several variables, for example, concentration of the hydroxy amine salt, solubility of the amine salt and phosgene in the reaction medium, reaction temperature, pressure and rate of addition of the phosgene, no hard and fast rule can be devised regarding the optimum conditions to be employed.

In a preferred embodiment of the present process a toluene solution containing the hydroxy amine salt in a concentration of from about 10 to 40 percent was gradually added to a solution of phosgene in toluene over a period of approximately 30 minutes. Thereafter phosgene was subsequently sparged through the reaction mixture for about 5 hours while the temperature is raised from about 30° to about 70° C. After removal of the by-product hydrogen halide and the solvent, a crude amino chloroformate hydrohalide product was obtained which can be recovered and refined by known purification techniques such as washing and the like.

In practice, it has been found that the mole ratio of phosgene to hydroxy amine salt in the initial reaction medium preferably should be in excess of 3:1, although satisfactory results have been obtained at a lower ratio. When the phosgene subsequently is sparged into the reaction medium, feed rates of up to about 10 moles of phosgene per mole of amine salt per hour are preferred.

Although the direct phosgenation of the hydroxy amine salt in the inert normally liquid reaction medium in the absence of a hydrogen chloride acceptor is the most economically attractive process, the use of tertiary amines having basic strengths somewhat less than the amine as acceptors for the by-product halide often result in time and temperature advantages over the direct process.

The carbonate amines are then conveniently prepared by reacting the amino chloroformate hydrochloride with a monohydric or polyhydric primary alcohol in which the chloroformate is at least partially soluble. For example, methyl 2-aminoethyl carbonate hydrochloride is prepared by the addition of 2-aminoethyl chloroformate hydrochloride to methanol, while the temperature is maintained at about 30° C., by external cooling, followed by evaporation and recrystallization from methanol. In some instances, depending upon the degree of solubility of the particular amino chloroformate hydrohalide in the alcoholic reactant it may be necessary to employ a solvent which will increase the solubility characteristics of the chloroformate.

The starting materials for the production of the novel carbonate amines of the present invention, as hereinbefore indicated, are the corresponding salts of hydroxy compounds having primary amino groups and monohydric or polyhydric alcohols. The amine compounds can be conveniently represented by the following general formula:

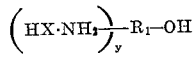

wherein $R_1$ and $y$ have the same value as previously indicated and HX represents hydrogen chloride, hydrogen bromide, or mineral acids such as sulfuric, phosphoric, and the like. Other acid salts can also be utilized but inasmuch as hydrogen chloride has a common anion with phosgene it is the preferred acid, both from this; as well as economic considerations.

Suitable starting materials for the novel compositions of the first embodiment of this invention include the salts represented by the class formula:

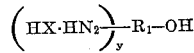

wherein $R_1$, $y$ and HX are as previously defined. Illustrative starting compounds include the hydrohalide salts of the following primary amino alcohols: 2-aminoethyl alcohol, 3-aminopropyl alcohol, 4-aminobutyl alcohol, 5-aminopentyl alcohol, 7-aminoheptyl alcohol, 8-aminooctyl alcohol, 9-aminononyl alcohol, 10-aminodecyl alcohol, 2-methyl-3-aminopropyl alcohol, 2,2-dimethyl-3-aminopropyl alcohol, 3-ethyl-5-aminopentyl alcohol, 3,4-diethyl-5-aminopentyl alcohol, 4,4-dimethyl-6-aminohexyl alcohol, 2-methyl-4-ethyl-6-aminohexyl alcohol, 8-aminononyl alcohol, 5,6,7-triethyl-9-aminononyl alcohol, 4-amino-2-butenyl alcohol, 5-amino-3-pentenyl alcohol, 7-amino-4-heptenyl alcohol, 8-amino-4-octenyl alcohol, 9-amino-5-nonenyl alcohol, 10-amino-6-decenyl alcohol, 3-ethyl-5-amino-3-pentenyl alcohol, 3,4-dimethyl-5-amino-3-pentenyl alcohol, 2-methyl-4-ethyl-6-amino-3-hexenyl alcohol, 5,6,7-triethyl-9-amino-7-nonenyl alcohol, 2-phenyl-3-aminopropyl alcohol, 3-naphthyl-5-aminopentyl alcohol, 3-styryl-5-aminopentyl alcohol, 4-tolyl-6-aminohexyl alcohol, 6-cumenyl-7-aminoheptyl alcohol, 5-xylyl-8-aminooctyl alcohol, 7-mesityl-9-aminononyl alcohol, 2-cyclohexyl-3-aminopropyl alcohol, 3-cyclohexyl-5-aminopentyl alcohol, 4-cyclohexyl-6-aminohexyl alcohol, 5-cyclohexylmethyl-7-aminoheptyl alcohol, 3-cycloheptyl-5-aminopentyl alcohol, 3-cyclohexenyl-5-aminopentyl alcohol, 5-cycloheptenylmethyl-8-aminooctyl alcohol and the like; 2-aminocyclobutyl alcohol, 3-aminocyclopentyl alcohol, 4-aminocyclohexyl alcohol, 5-aminocycloheptyl alcohol, 6-aminocyclooctyl alcohol, 3-amino 4-cyclopentenyl alcohol, 4-amino-5-cyclohexenyl alcohol, 2-aminocyclobutylmethyl alcohol, 2-amino-3-ethylcyclobutyl alcohol, 3-aminoethyl-2-cyclobutyl alcohol, 3-aminocyclopentylmethyl alcohol, 3-amino-2-ethylcyclopentyl alcohol, 2-aminoethyl-3-cyclopentyl alcohol, 5-aminocycloheptylmethyl alcohol, 3-amino-5-methylcyclohexyl alcohol, 3-amino-5,6-dimethylcyclohexyl alcohol, 3-amino-4-ethylcyclopentyl alcohol, 3-amino-4,5-diethylcyclopentyl alcohol, 4-amino-5-methyl-5-cyclohexenyl alcohol, and the like; 4-aminophenol, 2-aminophenol, 3-aminophenol, 7-amino-2-naphthol, 7-amino-1-naphthol, 4'-amino-4-biphenylol 5-amino-2-indenol, 4-aminobenzyl alcohol, 4-aminophenylethyl alcohol, 7-amino-2-naphthylmethyl alcohol, 3-aminopropyl-4-phenol, 4-aminomethylphenol 2 (3-aminopropyl)-naphthol, 4-amino-2-methylphenol, 6-amino-2,4-xylol, 4-amino-3-cumenol, 4-amino-2-methoxyphenol, 4-aminostyryl alcohol, 4(3'-amino-1-propenyl) phenol, and the like.

The primary alcohols which are reacted with the amino chloroformate hydrohalide, include the monohydric alcohols of from 1 to 8 carbon atoms and the polyhydric alcohols of from 2 to 200 carbon atoms. Particularly preferred alcohols include methanol, ethanol, propanol, butanol, pentanol, hexanol, heptanol, octanol, ethylene glycol, diethylene glycol, triethylene glycol, the polyethylene glycols having molecular weights of up to 600, and higher, pentaerythritol, and the like.

In general, the conversion of the carbonate amine or carbonate amine salt to the carbonate isocyanate is accomplished by sparging a carbonyl dihalide, more preferably phosgene, through a slurry of the carbonate amine or the carbonate amine hydrohalide contained in an inert, normally liquid reaction medium at a temperature within the range of from about 50° to about 225° C., more preferably from about 60° to about 160° C., and thereafter recovering the carbonate isocyanate. In either instance, it is believed that the intermediate carbamoyl chloride is first formed from the free amine and subsequently thermally degraded to the diisocyanate at the reaction temperature employed.

In general, the liquid reaction medium employed in the conversion of the carbonate amine or carbonate amine salt to the corresponding novel carbonate isocyanates must be inert to the reactants and stable under the conditions employed. Moreover, it should be easily separable from the resulting carbonate isocyanate. Typical inert, liquid solvents which have been found suitable for utilization as media in the process of the present invention include, among others, aromatic hydrocarbons such as toluene, xylene, naphthalene, tetrahydronaphthalene, benzene, biphenyl, cymene, amylbenzene; cycloaliphatic hydrocarbons such as cyclohexane, heptylcyclopentane, decahydronaphthalene; the chlorinated aromatic hydrocarbons such as chlorobenzene, ortho-dichlorobenzene, 1,2,4-trichlorobenzene; the chlorinated aliphatic hydrocarbons such as carbon tetrachloride, tetrachloroethylene, trichloroethylene; the dialkyl ketones such as diisobutyl ketone, methylisobutyl ketone, methylhexyl ketone, diisopropyl ketone and other solvents such as tetramethylene sulfone, and the like.

Although reaction temperatures within the aforementioned range of from about 50° to about 225° C., have been found desirable, temperatures above and below this range can also be utilized. However, from economic consideration the optimum yield and rate of reaction are usually attained within the aforesaid ranges. The particular temperature employed will be dependent in part upon the carbonate amine or carbonate amine salt starting material.

The optimum temperature for the conversion of the carbonate amine to the carbonate isocyanate is influenced, to a degree, by other reaction variables. For instance, in a batch type reactor with ortho-dichlorobenzene as the inert reaction medium, an amine hydrohalide concentration of 20–25 weight percent, based on the weight of the medium, and a phosgene feed rate of 0.5 to 1.0 mole per mole of amine hydrohalide per hour, the optimum temperature range is from about 60° C. to about 160° C. At temperatures below 60° C., the reaction times were too long to be practical, while at temperatures above 170° C., the isocyanate was, in part, converted to resinous materials. For optimum conversion, the concentration of carbonate amine dihydrohalide in the reaction medium should be from about 2 to about 50 weight percent based on the weight of the medium.

In a preferred embodiment of the present process the amine hydrochloride was slurred in 1,2-dichlorobenzene. Thereafter, gaseous phosgene was sparged through the reaction mixture at a temperature within the aforementioned range and for a period of time to essentially complete the reaction. After removal of the by-product hydrogen chloride and the solvent a crude isocyanate product was obtained which was refined by known purification techniques such as distillation, washing and the like.

In practice, it has been found that the mole ratio of phosgene to carbonate amine hydrohalide amine hydrochloride in the initial reaction medium preferably should be in excess of 3:1, although satisfactory results have been obtained at a lower ratio. When the phosgene subsequently is sparged into the reaction medium, feed rates of up to about 10 moles of phosgene per mole of amine per hour are preferred, although higher rates can equally as well be employed.

The following examples are illustrative:

*Example 1.—2-aminoethyl chloroformate hydrochloride*

Phosgene was sparged through a slurry of 194 grams, (2 moles) of 2-aminoethanol hydrochloride in 582 grams of chloroform at a rate of 0.5 mole per mole of 2-aminoethanol hydrochloride per hour while the stirred mixture was maintained at 52° C. When there was no HCl being evolved, the product was isolated by filtration, washed with two-300 cubic centimeter portions of ether and dried. 232 grams (73% yield) of product was obtained with a melting point of 110–111° C. The product was found to have the following compositions—Calculated for $C_3H_7NO_2Cl_2$: C, 22.50; H, 4.37; N, 8.76. Found: C, 23.02; H, 4.79; N, 8.76. Infrared spectrum was consistent with that of the assigned structure with maxima at $5.65\mu$ (chloroformate C=O); $8.45\mu$ and $8.65\mu$ (chloroformate C—O).

*Example 2.—Methyl 2-aminoethyl carbonate hydrochloride*

2-aminoethyl chloroformate hydrochloride (289 grams, 1.8 moles) was added to 500 cubic centimeter of methanol with the reaction temperature being maintained at 30° C. by external cooling. 237 grams (84.3% yield) of product was recovered on evaporation of the solvent which on recrystallization from methanol had a melting point of 124–126° C. The product was found to have the following compositions—Calculated for $C_4H_{10}NO_3Cl$: C, 30.85; H, 6.44; N, 9.01. Found: C, 30.95; H, 6.57; N, 9.14. Infrared spectrum was consistent with the assigned structure with absorption maxima at $5.7\mu$ (carbonate C=O); $7.9\mu$ (carbonate C—O). The free amine is obtained upon basification of the hydrochloride salt.

*Example 3.—Methyl 2-isocyanatoethyl carbonate*

Phosgene was sparged through a slurry of 19 grams (0.13 mole) of methyl 2-aminoethyl carbonate hydrochloride in 190 grams of toluene at a rate of 10 moles per mole of the aminoethyl carbonate hydrochloride per hour with the reaction temperature being maintained at 87° C. The phosgene addition was terminated in 4 hours when no further hydrogen chloride was detected by vapor phase chromatographic analysis. The product (13 grams, 66.3 percent yield) was isolated from the resulting clear solution by distillation. The liquid product had a boiling point of 66° C. at a pressure of 1.2 millimeters of mercury, and a refractive index, $n_D^{30}$ of 1.4379. The product was found to have the following compositions—Calculated for $C_5H_7NO_4$: C, 44.45; H, 5.18; N, 10. Found: C, 44.31; H, 5.01; N, 10.49. Infrared is in agreement with that of the assigned structure with absorption maxima at $4.42\mu$ (isocyanate —NCO); $4.75\mu$ (carbonate C=O) and $7.93\mu$ (carbonate C—O).

Although the invention has been illustrated by the preceding examples, the invention is not to be construed as limited to the materials employed therein, but rather, the invention encompasses the generic area as hereinbefore disclosed. Various modifications and embodiments of this invention can be made without departing from the spirit and scope thereof.

What is claimed is:

1. Alkyl isocyanatoalkyl carbonate wherein the alkyl moiety has from 1 to 8 carbon atoms, and wherein the isocyanatoalkyl moiety has from 2 to 12 carbon atoms.

2. Alkylene bis(isocyanatoalkyl carbonate) wherein the alkylene moiety has up to 8 carbon atoms, and wherein the isocyanatoalkyl moieties have from 2 to 12 carbon atoms.

3. Methyl isocyanatoethyl carbonate.

References Cited

UNITED STATES PATENTS 1,775,587  9/1930  Callsen _____ 260—463

FOREIGN PATENTS 15,348  1894  Great Britain.

OTHER REFERENCES

Vieles et al.: Bull. Soc. Chim. France, 5th series, vol. 20, pp. 287–289 (1953).

CHARLES B. PARKER, *Primary Examiner.*

F. D. HIGEL, *Assistant Examiner.*